United States Patent
Isaacs et al.

(10) Patent No.: US 6,985,238 B2
(45) Date of Patent: Jan. 10, 2006

(54) NON-CONTACT MEASUREMENT SYSTEM FOR LARGE AIRFOILS

(75) Inventors: Ralph Gerald Isaacs, Cincinnati, OH (US); John Charles Janning, Cincinnati, OH (US); Francis Howard Little, Cincinnati, OH (US); James Robert Reinhardt, Okeana, OH (US); Joseph Benjamin Ross, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 411 days.

(21) Appl. No.: 10/065,192

(22) Filed: Sep. 25, 2002

(65) Prior Publication Data

US 2004/0057057 A1 Mar. 25, 2004

(51) Int. Cl.
*G01B 11/24* (2006.01)

(52) U.S. Cl. .................. 356/601; 356/613; 702/155; 702/167

(58) Field of Classification Search .............. 356/601, 356/602, 613, 603–612; 700/182, 192; 702/104, 702/155, 167; 250/559.19, 559.2, 559.22
See application file for complete search history.

(56) References Cited

U.S. PATENT DOCUMENTS

| | | | |
|---|---|---|---|
| 4,226,536 A | * | 10/1980 | Dreyfus et al. ............. 356/602 |
| 4,325,640 A | * | 4/1982 | Dreyfus et al. ............. 356/602 |
| 4,908,782 A | | 3/1990 | Pekarek et al. ............. 364/560 |
| 4,945,501 A | | 7/1990 | Bell et al. ............... 364/571.05 |
| 5,047,966 A | | 9/1991 | Crow et al. ................. 364/560 |
| 5,208,763 A | | 5/1993 | Hong et al. ............ 364/551.02 |
| 5,495,540 A | | 2/1996 | Frankot et al. ............. 382/294 |
| 5,521,847 A | | 5/1996 | Ostrowski et al. .......... 364/559 |
| 5,627,771 A | | 5/1997 | Makino ..................... 364/560 |
| 5,715,166 A | | 2/1998 | Besl et al. ............. 364/474.24 |
| 5,990,901 A | | 11/1999 | Lawton et al. .............. 345/429 |
| 6,041,138 A | | 3/2000 | Nishida ..................... 382/197 |
| 6,229,872 B1 | * | 5/2001 | Amos .......................... 378/58 |
| 6,411,915 B1 | | 6/2002 | Nguyen et al. ............. 702/104 |
| 6,700,668 B2 | * | 3/2004 | Mundy et al. .............. 356/601 |
| 6,748,112 B1 | * | 6/2004 | Nguyen et al. ............. 382/203 |
| 2003/0210406 A1 | * | 11/2003 | Hardy ........................ 356/603 |

FOREIGN PATENT DOCUMENTS

EP          381067 A2    1/1990

* cited by examiner

*Primary Examiner*—Layla G. Lauchman
(74) *Attorney, Agent, or Firm*—Jean K. Testa; Christian G. Cabou

(57) ABSTRACT

A non-contact measurement system employing a non-contact optical sensor and an edge detection sensor with a positioning system for moving the sensors over the surface and edges of a part (A) held in a predetermined, fixed position. The part is aligned in a co-ordinate system for obtaining accurate measurements of the part's surface (S) and edges (E). For parts smaller than the optical sensor's field of view, the part is rotated about an axis so both sides of the part are viewed by the sensor. If required, the part can also be shifted linearly along a horizontal axis (X) parallel to the sensor. For parts larger in size than the sensor's field of view, the part is moved along a vertical axis (Y) in predetermined segments so all of the part is exposed to viewing by the sensor.

21 Claims, 4 Drawing Sheets

NON-CONTACT MEASUREMENT SYSTEM FOR LARGE AIRFOILS

BACKGROUND OF INVENTION

This invention relates to measuring systems, and more particularly to an optically based system for non-contact measurement of a part such as an airfoil having a complex part shape. Because the shape of an airfoil is complex it has a critical bearing on the performance of an engine in which it is installed. Airfoil shape is defined by a CAD definition in terms of sections, or a three dimensional (3D) surface characterized by a number of parameters which include contour, bow, and warp. Current methods inspecting airfoils utilize dedicated hard gauges or coordinate measuring machines (CMMs). Both methods determine whether or not an airfoil falls within drawing specified limits for contour, bow, twist and chord, as well as other parameters.

There are a number of problems associated with these inspection methods. First, hard gauges are expensive, slow to manufacture and dedicated to a single airfoil shape. Manufacturing shops must store and perform regular maintenance on all their hard gauges. Second, a significant amount of time is required to inspect an airfoil. In a manufacturing environment, increasing the speed of inspection (so long as inspection accuracy is not compromised) can provide significant cost savings. Another factor is the reliability of the inspection results. With complex surface shapes such as airfoils have, small errors in the use of hard gauges or CMMs may result in acceptable parts being rejected, or unacceptable parts being accepted. Related to this third factor is need to have reliable inspection data available for analysis to both monitor the manufacturing process to improve both the process and the parts produced.

Given the above, it would be advantageous to have available an improved inspection method which facilitates lower gauge cost and quicker part inspection while providing highly accurate and reliable test results.

The present invention utilizes one or more non-contact sensors, in combination with appropriate data acquisition systems and data processing, to inspect the surface shape of an airfoil, determine its manufactured parameters, and compare the acquired shape data to specified limits to determine if the airfoil meets acceptance criteria. The advantage of using non-contact inspection methods is that the speed of inspection can be increased, results are more reliable because the process is automated, and quantitative data relating to airfoil shape is immediately available for use in monitoring the manufacturing process as well as for future use in making design improvements.

A wide variety of non-contact sensors are commercially available, and are readily integrated into systems performing non-contact measurement of physical objects. Despite this, however, many previous attempts to measure airfoil parameters using these sensors have failed because of i) the measurement system's inability to meet accuracy and speed requirements, and ii) difficulties related to effects of the airfoil's surface finish on optically measuring the surface characteristics of the airfoil.

SUMMARY OF INVENTION

Briefly stated, the present invention integrates one or more commercially available non-contact optical sensors with a positioning system for moving the sensors over surface and edges of an airfoil which is held in a holding fixture in a position which is repeatable from one airfoil to the next. The airfoil is aligned in a standardized coordinate system for the purpose of relating accurate measurements of the airfoil's surface and edges to their design values. For airfoils which are smaller than the sensor's field of view, the airfoil is rotated about a rotary stage so both sides of the airfoil may be viewed by the sensor. For airfoils larger in size than the sensor's field of view, the sensors and the part are moved relative to each other so that the sensor covers all areas of the airfoil surface and edges. Data collected from the resulting views is converted to the co-ordinate system using data processing. In one embodiment, the sensor is mounted on a horizontal positioning stage (Y-axis) which is attached to an orthogonal, vertical positioning stage (Z-axis). This enables sensor motion over a Y-Z plane. The airfoil is also installed on a rotary stage which is mounted on a horizontal positioning stage (X-axis). This allows the part to be moved closer or farther away from the sensor plane. This combination allows full sensor coverage of all the airfoil surfaces and edges; provided, positioning stages of sufficient size are used.

The foregoing and other objects, features, and advantages of the invention as well as presently preferred embodiments thereof will become more apparent from the reading of the following description in connection with the accompanying drawings.

BRIEF DESCRIPTION OF DRAWINGS

In the accompanying drawings which form part of the specification.

Corresponding reference numerals indicate corresponding parts throughout the several figures of the drawings.

DETAILED DESCRIPTION

Figure 1A:
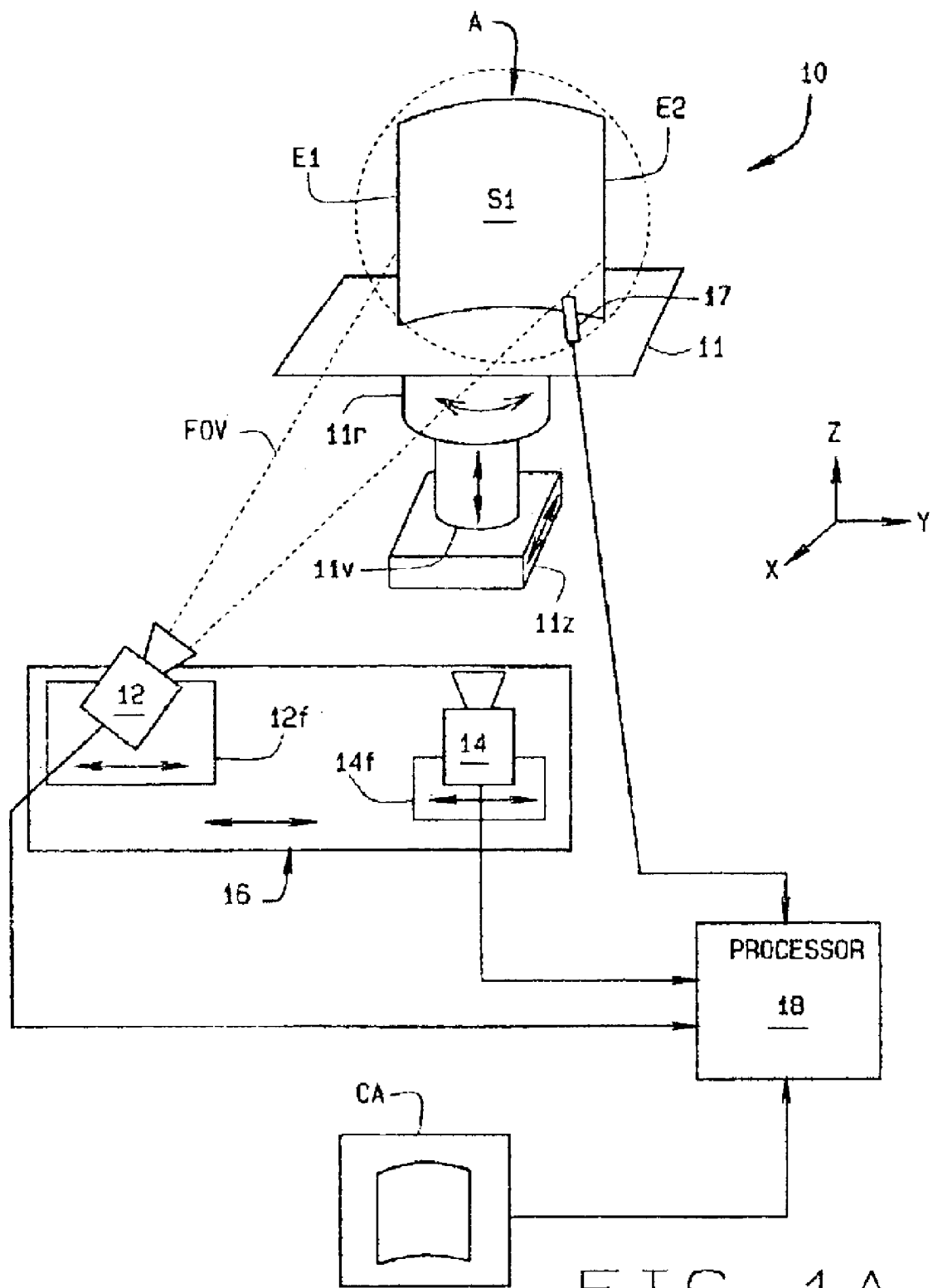
FIGS. 1A and 1B are simplified representations of a first embodiment of a system of the present invention for measuring a complex part shape such as an airfoil; and, FIGS. 2A and 2B are similar representations of the system for use in measuring a larger complex part shape.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Referring to the drawings, a non-contact measurement system 10 of the present invention is used to measure a complex part shape such as an airfoil A to determine acceptability of the part. In the drawings, airfoil A is shown mounted on a precision root gripping fixture 11 which holds the airfoil in a desired fixed position which is repeatable from one airfoil to the next. In measuring the characteristics of the airfoil, it is important to both measure the surface features of the part over the entire surface of the part, and to locate the edges of the part. To accomplish this, system 10 employs a non-contact, large area optical sensor 12 and a high resolution point sensor 14. Sensor 14 supplements the sensor 12 where needed; for example, edge location and shape measurement. Both sensors are commercially available sensors. In one embodiment of the system, the large area sensor is eliminated and the high resolution point sensor performs all of the measurements. Sensor 12 is, for example, available from Brooks-PRI of 149 Sidney St., Cambridge, Mass., under there model designation 4DI. Edge detection sensor 14 is available from Optimet (Optical Metrology LTD) of 9 Electronics Ave., Danvers, Mass., under their model designation ConoProbe. Each sensor is mounted on a fixture 12f and 14f respectively. These fixtures are part of a positioning platform 16 by which the sensors are moved linearly (along the Y-axis) with respect to the airfoil so to measure all of the surface features of the part and precisely locate its edges. Fixtures 12f and 14f, and platform 16 also allow the respective sensors to be positioned in locations relative to the airfoil so to improve the accuracy of data obtained from the sensors. Moving the sensors from one position to another using platform 16 allows different sets of data to be obtained for the airfoil for different orientations of the sensors relative to the part. Although not shown in the drawings, those skilled in the art will understand that optical sensor 12 and point sensor 14 may be fixed in place with fixture 11 being movable along the Y-axis so all the surface and edge features of the part are measured.

In testing airfoil A for part acceptability, the measurements of surface features and edge locations are compared with those for a master CAD model CA for the part. Software for controlling such an inspection system and for comparing airfoil measurements with a master CAD model is available Tecnomatix Technologies, Inc of Northville, Mich. If a master CAD model is not available, a complete set of surface feature measurements for a reference part (a so called "golden blade") may be utilized instead. To insure that comparison of the part features to the master CAD model or reference part are proper, a surface probe 17 may be placed in contact with the airfoil. It is also possible to perform this alignment without a surface probe 17 if appropriate software is available to accomplish this task using data from point sensor 14. This is done to aid in the alignment of the airfoil to a reference X-Y-Z coordinate system defined by the master CAD model CA or reference part. Once the alignment is established, edges E1 and E2 of the part are located and all features of the part's concave and convex surfaces S1 and S2 are measured and stored.

Figure 1B:
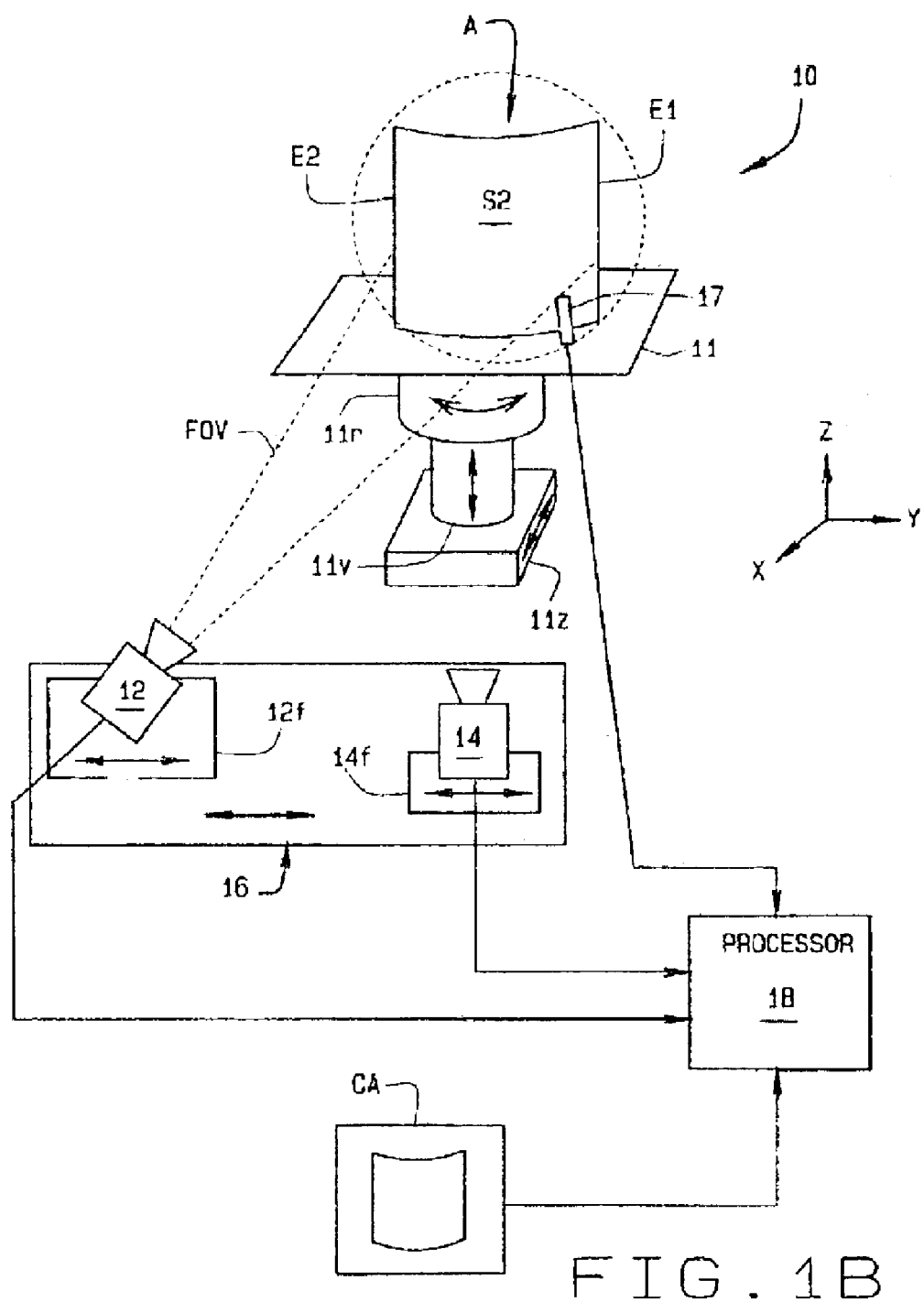
Figure 2A:
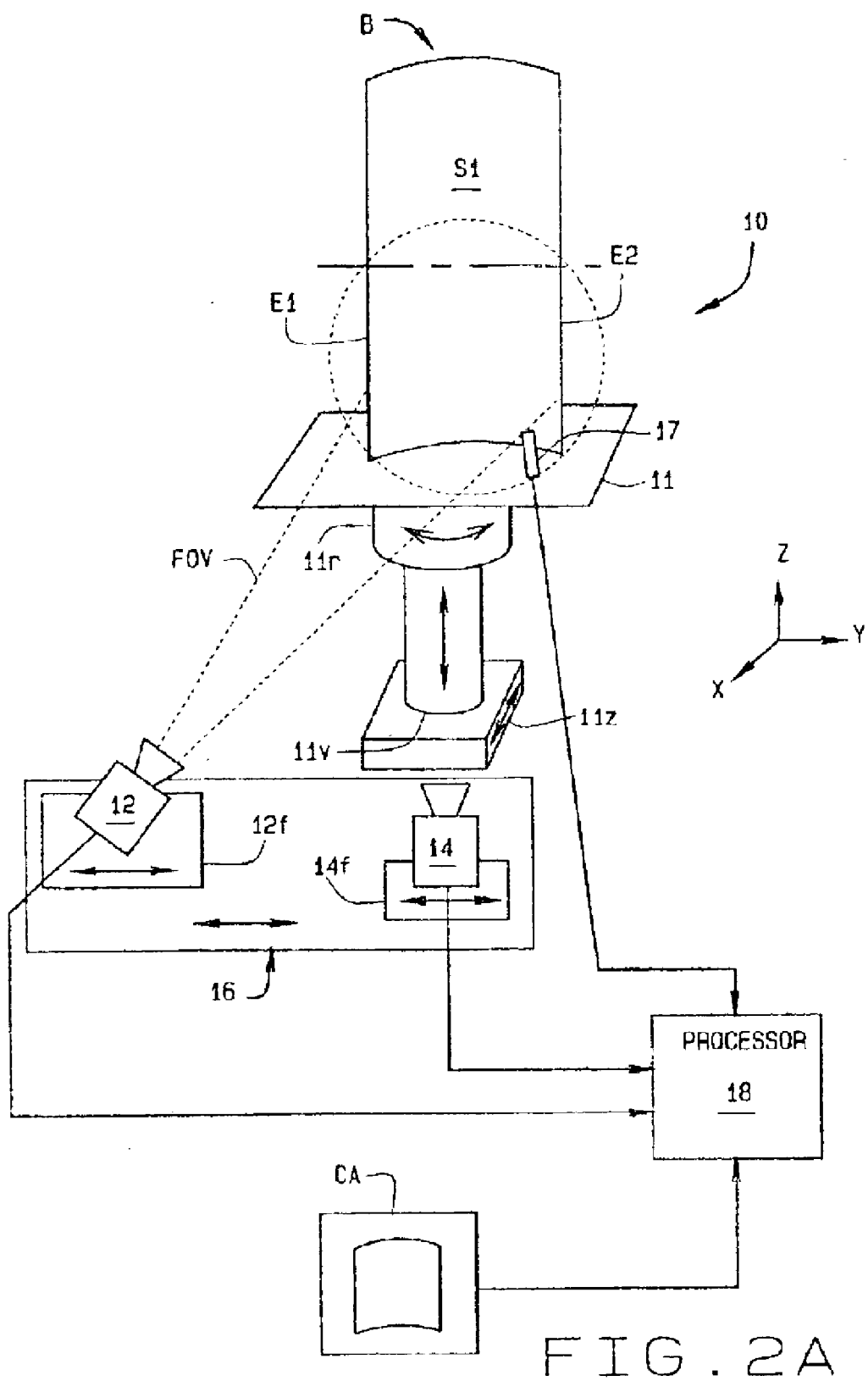
Figure 2B:
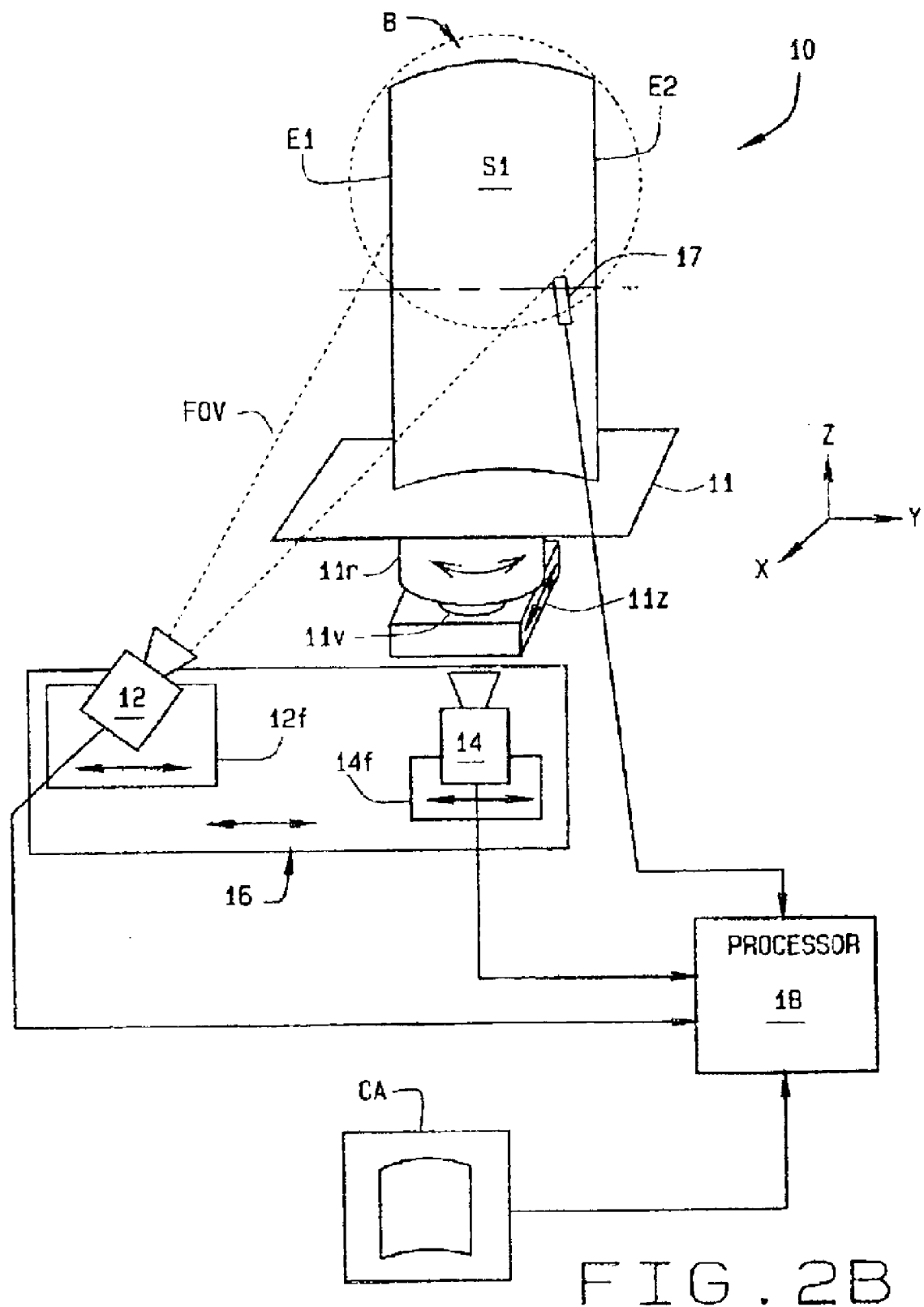

If the size of the airfoil is such that it entirely fits within the field-of-view (FOV) of optical sensor 12 as shown in FIG. 1A, then once the surface features for one side S1 of the airfoil have been obtained, fixture 11 is rotated to turn the part around as indicated in FIG. 2B. If the part does not initially fit within the FOV, then, in some circumstances, moving the fixture along an X-axis toward or away from optical sensor 12 will enable the part to fit completely within the sensor's FOV. Although not shown in the drawings, it will be understood by those skilled in the art that the part could remain fixed in place and the sensors moved along the X-axis until the part fits completely within the sensor's FOV. Once rotated, the surface features for the opposite side S2 of the airfoil are also obtained using sensor 12 as shown in FIG. 1B. Again, edge sensor 14 is used to locate the respective edges S1, S2 of the part. While not shown in the drawings, it will be understood that the same FOV considerations also pertain to edge location sensor 14.

Once all of the surface feature and edge location information for airfoil A has been obtained, a processor 18 analyzes the resultant data. The data for the airfoil is compared by the processor with that from the master CAD model CA, or the reference part, to determine if the part is acceptable.

Some airfoils (airfoil B in FIGS. 2A and 2B) may be so large that when they are installed on fixture 11, they do not fit within the field-of-view of sensor 12, even after moving the fixture relative to the sensor's platform 16. In these situations, surface feature and edge information for the airfoil is obtained for a set of overlapping segments of the airfoil. In the simplified representation of FIGS. 2A and 2B, airfoil B and fixture 11 are moved vertically along a Z-axis so that as shown in FIG. 2A, the lower half of the airfoil is first measured. Thereafter, the platform is moved so the upper half of the airfoil is measured. This is as shown in FIG. 2B. Although not shown in the drawings, it will be understood by those skilled in the art that once one side S1 of the airfoil is measured, the fixture is rotated as before, so the other side of airfoil B can similarly be measured. That is, first the lower half of the airfoil is measured, then fixture 11 and airfoil B are moved so the upper half of the airfoil can be measured.

In reality, an airfoil such as airfoil B would be divided into segments on the order of 4"–5" in height. This would mean that 6–7 sections would be individually measured in order to obtain the requisite surface feature and edge location information needed to determine part acceptability. It will also be understood that besides moving the part vertically along the Z-axis to obtain the necessary information, depending upon the width of the airfoil as mounted on fixture 11, the fixture may also be moved from side-to-side relative to the sensors (along the Y-axis) to obtain measurement data with full coverage of the airfoil.

Again it will be appreciated that while not shown in the drawings, the sensors can be moved vertically along the Z-axis while the part remains stationary to obtain the requisite measurement information.

The system of the invention can be calibrated with NIST traceability through the use of NIST traceable artifacts. As noted, the system also allows for geometric corrections of the sensors' orientation with respect to the part under test so to improve the accuracy of the data obtained from the sensors. Importantly, non-contact sensors 12 and 14 provide highly accurate information. Even though the sensors have a limited field of view (FOV); nonetheless, system 10 facilitates their use to inspect a wide range of airfoils of different sizes without any loss in the accuracy of data obtained by the sensors. The sensors are also tolerant of variations in surface finish over the surface of the airfoil. Those skilled in the art will understand that some portions of an airfoil's surface are more highly reflective of light striking the surface of the part than other portions of the surface. These variations are accommodated for within system 10 so there is no loss in accuracy of the data obtained for one portion of the airfoil's surface when compared with that obtained from another portion of the surface. Finally, processor 18 stores the data obtained for each airfoil tested using system 10. This data is useful in monitoring various airfoil shape parameters as an aid to initial process set-up, or to determine if changes in manufacturing processes need to be made, etc.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A system for the non-contact measurement of a surface of a complex part shape comprising:

a support on which the part is mounted for holding the part in a predetermined fixed position;

a large area optical sensor positioned so the part is substantially within the sensor's field of view at the distance from the sensor where the part is mounted on its support, the optical sensor measuring surface features of the part;

positioning means on which the optical sensor is installed for moving the optical sensor over the surface of the part in a non-contact manner to locate surface features of the part in a co-ordinate system;

a high resolution point sensor for locating and measuring the edges of the part, the point sensor also being installed on the positioning means and moved over the part in a non-contact manner to locate the edges of the part's surface; and, a processor processing the surface feature information and comparing the information with corresponding information from either a master part model or a reference part to determine acceptability of the part.

2. The system of claim 1 in which the processor also utilizes edge information from the point sensor in determining acceptability of the part.

3. The system of claim 1 further including a surface probe contacting the part, the support and the surface probe aligning the part in a co-ordinate system used for measuring the surface shape and locating the edges of the part.

4. The system of claim 1 further including means for rotating the support so the optical sensor and point sensor can measure surface features on all sides of the part and locate the edges of the part on each side thereof.

5. The system of claim 4 wherein the part is fixed in place and the positioning means moves relative to the part to obtain surface feature and edge information about the part.

6. The system of claim 4 wherein the sensors are fixed in place and the part moves relative to the sensors to obtain surface feature and edge information about the part.

7. The system of claim 4 further including moving means for moving the part along a vertical axis to raise and lower the part relative to the sensor whereby if the part is larger in size than the optical sensor's field of view, the part can be viewed in segments by the sensors to measure all of the surface features of the part and locate the edges of the part.

8. The system of claim 4 further including means for moving the sensors along a vertical axis to raise and lower the sensors relative to the part whereby if the part is larger in size than the optical sensor's field of view, the part can be viewed in segments by the sensors to measure all of the surface features of the part and locate the edges of the part.

9. The system of claim 6 in which the moving means further moves the part along a third axis orthogonal to the other two axes to move the part closer to, or farther away from, the sensors so the part is located completely within the sensor's field of view.

10. The system of claim 6 in which the sensors are moved along a third axis orthogonal to the other two axes to move the sensors closer to, or farther away from, the part so the part is located completely within the sensor's field of view.

11. A system for the non-contact measurement of a surface of a complex part shape comprising:

a support on which the part is mounted for holding the part in a predetermined fixed position;

an area optical sensor for measuring surface features on the part;

a high resolution edge sensor for locating an edge of the part and determining its shape profile;

positioning means for moving the optical sensor and edge position sensor over the surface and edges of the part to locate surface features and edges of the part within a co-ordinate system;

moving means for moving the part relative to the respective sensors so if the part is larger in size than the optical sensor's field of view, the part can be viewed in segments by the optical sensor for the optical sensor to measure all the surface features of the part; and, a processor processing surface feature and edge information provided by the respective sensors and comparing the information with corresponding information from a reference of the part to determine acceptability of the part.

12. The system of claim 11 further including a surface probe contacting the part, the support and the surface probe aligning the part in a co-ordinate system used for measuring the surface shape and locating the edges of the part.

13. The system of claim 12 wherein the moving means moves the part in defined increments so to enable the part to remain aligned in the co-ordinate system.

14. The system of claim 11 further including means for rotating the support so the optical sensor and edge position sensor can measure surface features on all sides of the part and locate the edges of the part on each side thereof.

15. The system of claim 12 wherein the positioning means moves the part along a horizontal axis parallel to the sensors.

16. The system of claim 15 in which the moving means moves the part along a vertical axis to raise and lower the part, and further along a third axis orthogonal to the other two axes to move the part closer to, or farther away from, the optical sensor.

17. A method of non-contact measurement of the surface of a complex part shape comprising:

mounting the part upon a support which holds the part in a desired fixed position;

measuring surface features on the part with an optical sensor;

locating an edge of the part with an edge location sensor;

moving both the optical sensor and edge position sensor over the surface of the part to locate the surface features and edges thereof in a co-ordinate system;

moving the part relative to the respective sensors so if the part is larger in size than the optical sensor's field of view so the part can be viewed in segments by the optical sensor for the optical sensor to measure all of the surface features of the part; and, processing surface feature and edge information provided by the respective sensors and comparing the information with corresponding information from a reference of the part to determine acceptability of the part.

18. The method of claim 17 further including rotating the support so the optical sensor and edge position sensor can measure surface features on all sides of the part and locate the edges of the part on each side thereof.

19. The method of claim 18 further including contacting the part with a surface probe, the support and the surface probe aligning the part in the co-ordinate system used for measuring the surface shape and locating the edges of the part.

20. The method of claim 17 in which the part is moved in defined increments so to remain aligned in the co-ordinate system.

21. The method of claim 20 further including moving the part along an closer to, or farther away from, the optical sensor.

* * * * *